United States Patent [19]

Borg et al.

[11] 3,848,753

[45] Nov. 19, 1974

[54] TURNING MOVEMENT DEVICE FOR MATERIAL HANDLING APPARATUS

[75] Inventors: Sven Christer Borg, Handen; Christer Ragnar Hesson, Johanneshov; Erik Henning Nilsson, Trangsund, all of Sweden

[73] Assignee: Aktiebolaget Electrolux, Stockholm, Sweden

[22] Filed: Sept. 6, 1972

[21] Appl. No.: 286,714

[30] Foreign Application Priority Data
Apr. 14, 1972 Sweden................................ 4849/72

[52] U.S. Cl................. 214/1 B, 188/268, 192/149
[51] Int. Cl............................................. F16d 71/04
[58] Field of Search ... 214/1 CM, 1 Q, 1 B, 1 BC, 214/1 BD, 1 BV, 1 BH; 188/268; 192/149; 74/526; 267/141

[56] References Cited
UNITED STATES PATENTS

| | | |
|---|---|---|
| 1,335,263 | 3/1920 | Stronger ............................. 192/149 |
| 1,636,324 | 7/1927 | Reed .................................... 192/149 |
| 3,260,375 | 7/1966 | Lemelson ......................... 214/1 CM |
| 3,717,231 | 2/1973 | Kaufeldt .......................... 192/149 X |

*Primary Examiner*—Frank E. Werner
*Attorney, Agent, or Firm*—Alfred E. Miller

[57] ABSTRACT

The material handling apparatus is a robot which is capable of moving articles from and to a plurality of positions. The entire apparatus is constituted of several units which perform various movements. One of the units is an arm having a gripper attached to its free end. The gripper is mounted on a device that imparts a turning movement to an article being handled. Damping structures are mounted in the device which provide the proper damping for the gripper in the end positions of the turning movement, and are easily adjustable for different loading conditions. If desired, the gripper can be interchanged for a different gripper.

5 Claims, 4 Drawing Figures

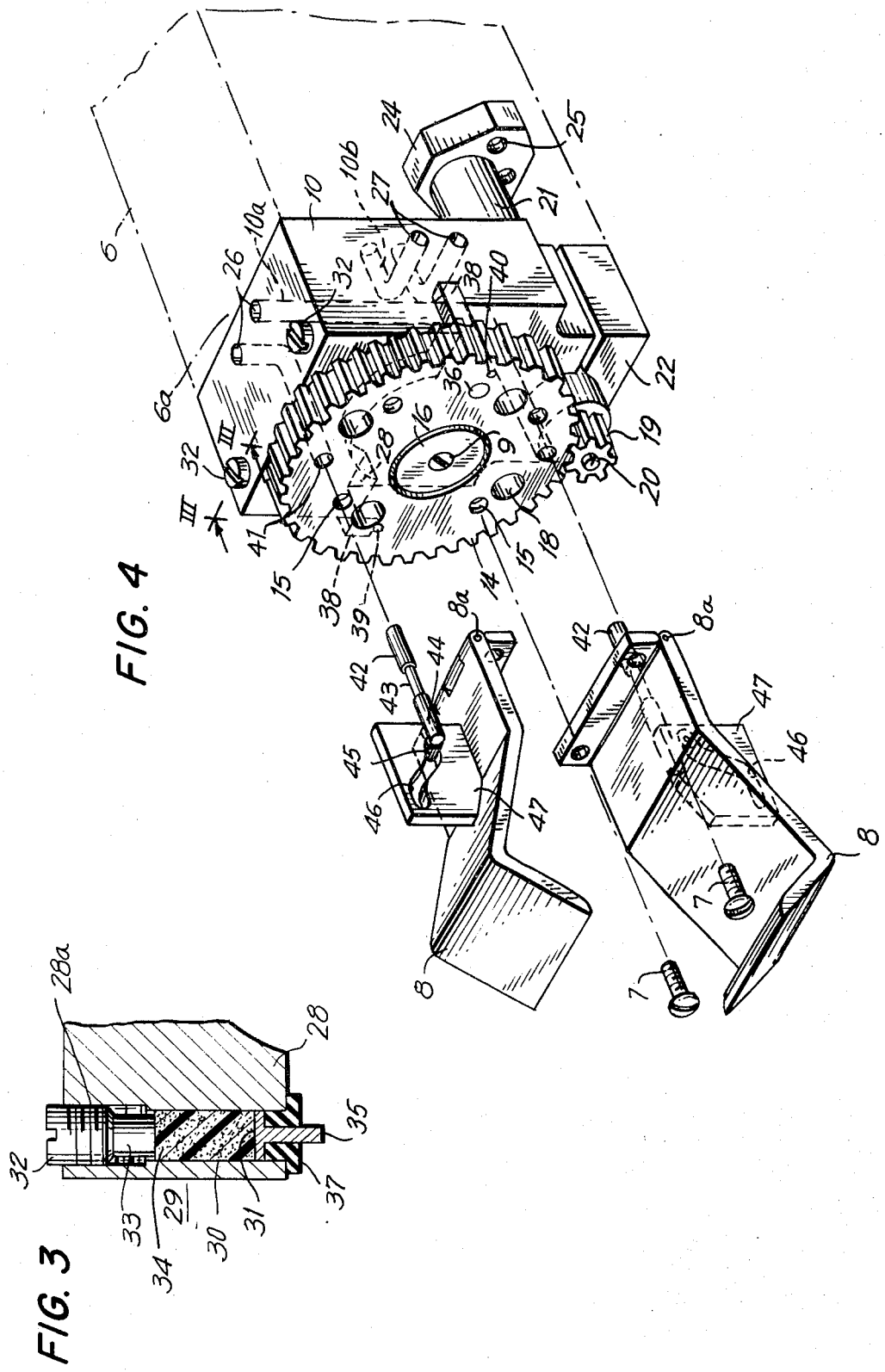

3,848,753

TURNING MOVEMENT DEVICE FOR MATERIAL HANDLING APPARATUS

BACKGROUND OF THE INVENTION

Robots which can automatically perform a variety of manufacturing processes are known, for example robots of this type are used in the machine tool industry. An example of this type of robot is shown and described in co-pending U.S. Pat. application Ser. No. 223,895, filed on Feb. 7, 1972, and assigned to a common assignee.

These robots move articles or workpieces from and to different positions and comprise several movable and interacting units. One of the units is an arm having a gripper at its free end which grasps the article and moves it to its programmed positions. It is therefore desirable that the gripper on the arm be capable of imparting a turning movement to the article and that it also be capable of being exchanged for another gripper. Furthermore, it has been found that the load on the extreme or free end of the arm will vary under different operational conditions and therefore a sufficient damping of the turning movement of the arm and gripper is difficult to achieve.

SUMMARY OF THE INVENTION

Our invention is to provide a turning movement device for a material handling apparatus in which damping of the turning movement device in the two end positions thereof is easily adjustable to different loading conditions of the device. In addition, different grippers may be exchanged for the gripper used in the device.

It is an object of the present invention to provide two separately adjustable damping means damping the movement of the turning movement device which takes the form of a wheel that is pivotally mounted on a block, the latter being removably attached to the material handling apparatus.

It is a further object of the present invention to replace the entire block having a gripper and damping means with another entire block provided with an attached gripper and damping means. However, if desired, only the grippers may be exchanged.

The invention will now be more fully described with reference to the accompanying drawings wherein:

BRIEF DESCRIPTION OF THE DRAWINGS

FIG. 3 is an enlarged scale sectional view of the details of the construction of the damping means, and FIG. 4 is a perspective view of the entire assembly of the turning movement device showing a diagrammatic illustration of the gripper and associated structure as well as the attachment to the extreme end of the arm of the material handling apparatus.

DESCRIPTION OF THE PREFERRED EMBODIMENT

Figure 1:
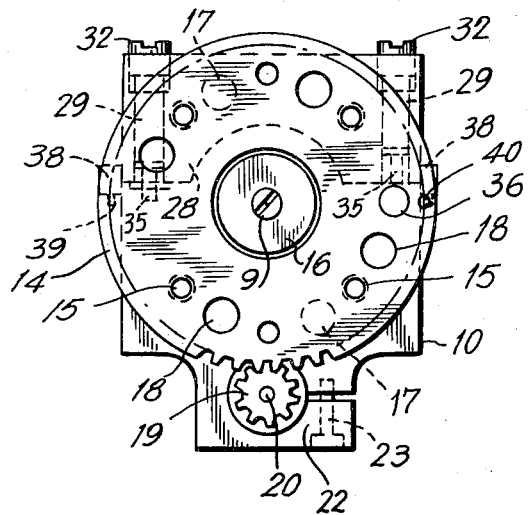
FIG. 1 is a front elevational view of the turning movement device for a material handling apparatus constructed in accordance with the teaching of the present invention.
Figure 2:
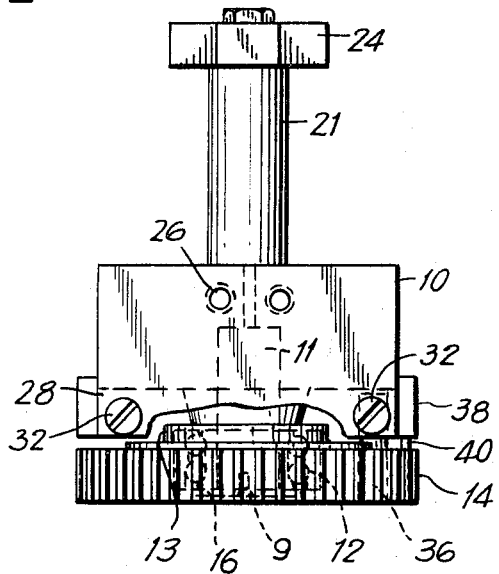
FIG. 2 is a top plan view of the structure shown in FIG. 1 with part thereof broken away for purposes of clarity.

As seen in FIGS. 1, 2, and 4, the block 10 is the attachment member being removably attached to the end of the arm 6 of a material handling apparatus such as a robot. Referring to FIG. 2, a shaft 11 is shown fixed in the block 10 and having a ball bearing unit 12. An attachment wheel 14 which functions as an attachment member is secured on the ball bearing unit 12 by means of the holder 13. The attachment wheel 14 is provided with spaced threaded holes 15 in which threaded members 7 of each gripper 8 are screw-connected. Moreover, each gripper is provided with a hinge 8a. A cover plate 16 for the ball bearing unit 12 is arranged at the center of the attachment wheel 14 and removably secured by means of screw 9.

The block 10 is shown secured to the extreme end 6a of arm 6 by means of attachment bolts (not shown) passing through the holes 17 in the block 10 (FIG. 1). Moreover, the attachment wheel 14 is provided with spaced openings 18 which can be aligned with holes 17 thereby permitting the bolts in holes 17 to be tightened or loosened by the appropriate tools.

As clearly seen in FIG. 4, the attachment wheel 14 is a gear wheel which meshes with a considerably smaller driving gear wheel 19 that is secured to the output shaft 20 of a drive motor 21. The latter is held in a clamp 22 and secured to the block 10 by means of a screw bolt 23 (FIG. 1). As seen in FIG. 4, the motor 21 is an air motor having an air coupling 24 provided with means 25 for connection to air conduits (not shown).

The block 10, as seen in FIG. 4, has connection means 26 and 27 which communicate with passageways 10a and 10b respectively in the block 10. The passageways 10b are automatically connected to the corresponding passageways (not shown) in the arm 6 of the material handling unit when the block 10 is attached to the end 6a of the arm 6. Furthermore, the connection means 26 is adapted to be connected to an air supply which supplies air to the gripper 8 while the connection means 27 is adapted to be connected to the connection means 25 of the air coupling 24. The drive motor 21 is secured to the block 10 in a manner whereby the air passageways are automatically interconnected. The attachment wheel has a rotating air coupling (not shown) which ensures communication between the gripper 8 and the connection means 26.

As seen in FIG. 4, the connection means 26 which communicates with an air supply is connected through an opening 41 in the attachment wheel 14 to a cylinder 42 having a reciprocating piston 43. The piston is provided with a piston extension 44 having an offest portion 45 that moves in the camming slot 46 of the upstanding plate 47. The selective application of compressed air to the cylinder 42 will cause the gripper 8 to move outwardly or inwardly.

The block 10 is shown having a projecting part 28 and damping means 29 are located in the part and adjacent to the side edges thereof. The details of the damping means 29 are shown in cross section on a larger scale in FIG. 3. As seen in FIG. 3, the damping means 29 comprises a cylinder 30 enclosing a reciprocating piston 31 having a piston rod 35. An adjusting screw 32 is threaded into a threaded portion 28a of the projecting part 28. The screw 32 is spaced from but facing the piston 31. A damping material 34 fills the space between the piston 31 and the end surface of the cylindrical unthreaded end portion 33 of the screw 32. The damping material 34 is an elastomer and preferably a foamed or expanded plastic material having open pores.

It will be noted that if a force is applied to piston rod 35 of piston 31, the material 34 dampens the movement of the piston 31. The desired damping of the movement of the piston can be varied by turning the screw 32 and its end portion 33 whereby the damping material 34 is precompressed to a predetermined degree. The damping adjustment is accomplished for different load conditions that the arm 6 of the material handling apparatus is called upon to handle. This damping adjustment can be easily and rapidly performed.

Since the damping material 34 is a foamed plastic with open pores, there is a reproduceable adjustment of the degree of damping and the damping material is capable of long life. On the other hand, if damping material with closed pores is used, the varying content of air in the pores causes different damping characteristics during different uses of the apparatus.

A cylindrical stop pin 36 is mounted on the attachment wheel 14, and as seen in FIG. 2, projects rearwardly. This stop pin coacts with the damping means 29 in the two end positions of the turning movement of the attachment wheel 14. When either of the end positions is reached, the stop pin 36 strikes the rod 35 of piston 31. It should be apparent that other stop abutment constructions can be substituted for the illustrated stop pin 36, for example, a stop shoulder.

When the turning movement of the attachment wheel 14 has been sufficiently dampened by the stop pin 36 coacting with the end of the rod 35 of the piston 31, the pin 36 pushes the rod 35 of the piston 31 inwardly and thereafter the pin strikes a stationary stop 37 (FIG. 3) on the damping means 29. The damping characteristics of the latter can be adjusted as described hereinabove, depending upon the load prevailing on the material handling apparatus under the selected operational condition whereby the end turning movement speed of the attachment wheel 14, in either direction, is approximately zero when the stop pin 36 abuts stationary stop 37.

A signalling means is also provided on the turning movement device at the end positions of the attachment wheel 14 which takes the form of limit switches 38 that signal a programming device for the apparatus which causes the drive motor 21 to stop or reverse the turning movement of the device. Each of the limit switches 38 is provided with an actuator 39 that is in the path of movement of another cylindrical pin or stop 40 fixed to the attachment wheel 14 and which strikes the actuator in either of the end positions of the attachment wheel 14.

It is to be understood that is is within the scope of the present invention to provide the damping means 29 at various locations, for example, at different relative angles thereby varying the magnitude of the turning movement of the turning movement device.

What is claimed is:

1. A turning movement device for a gripper of a material handling apparatus for angular movement of an article forwards and backwards through a predetermined angle comprising:
    a. a block element which is removably secured to the material handling apparatus,
    b. an attachment member for the gripper being pivotally supported on the element and movable through said predetermined angle,
    c. a driving motor for the attachment member,
    d. adjustable damping means for damping the movement of the attachment member in the two end positions of its turning movement,
    e. a driving medium for said driving motor and gripper, and
    f. said block being provided with passageways for flow of said driving medium to said gripper and driving motor, said material handling apparatus having a corresponding passageway, and at least one of the passageways in said block being automatically connected to the corresponding passageway when the block is fixed to said material handling apparatus.

2. A turning movement device as claimed in claim 1 further comprising a fixed stop on said attachment member, a bushing in the other end of said cylinder and enclosing the piston rod of said piston, one surface of said bushing limiting the movement of said piston in one direction and another surface of said bushing acting as a fixed stop and co-acting with the fixed stop of said attachment member.

3. A turning movement device for a gripper of a material handling apparatus for angular movement of an article in a vertical plane forwards and backwards through a predetermined angle comprising:
    a. a block element which is removably secured to the material handling apparatus,
    b. an attachment member for the gripper being rotatably supported on the element and movable through said predetermined angle,
    c. a pair of spaced stops mounted on said attachment member each having its major axis extending in a direction substantially parallel to the axis of rotation of said attachment member,
    d. a driving motor for the attachment member, and
    e. separate adjustable yieldable damping means for damping the movement of the attachment member in the two end positions of its turning movement when engaged by an adjacent stop, said damping means including a cylinder, compressible material of foamed plastic with open pores in said cylinder, a damper piston adapted for reciprocation in said cylinder, and an adjustment member in said cylinder for precompressing the material to a selected degree thereby changing the damping characteristics of the damping means.

4. A turning movement device as claimed in claim 3 wherein the compressible material is an elastomer.

5. A turning movement device as claimed in claim 4 wherein the elastomer is a foamed plastic with open pores.

* * * * *